METHOD OF MAKING THERMOELECTRIC COOLING DEVICE

Original Filed May 28, 1962

2 Sheets-Sheet 1

INVENTOR:
LEON PODOLSKY

BY Frederick Breitenfeld
ATTORNEY

METHOD OF MAKING THERMOELECTRIC COOLING DEVICE

Original Filed May 28, 1962

INVENTOR:
LEON PODOLSKY
BY Frederick Breitenfeld
ATTORNEY

United States Patent Office 3,330,698
Patented July 11, 1967

3,330,698

METHOD OF MAKING THERMOELECTRIC COOLING DEVICE

Leon Podolsky, Pittsfield, Mass., assignor to Drexel Institute of Technology, a corporation of Pennsylvania Original application May 28, 1962, Ser. No. 198,286, now Patent No. 3,142,158, dated July 28, 1964. Divided and this application Mar. 26, 1964, Ser. No. 355,000
3 Claims. (Cl. 117—226)

This application is a division of copending application Ser. No. 198,286, filed May 28, 1962, now U.S. Patent No. 3,142,158.

This invention relates to a method of making thermoelectric cooling devices, and more particularly to a method of making devices in which passage of current through a thermocouple is cause to produce the desired effect.

It is of course well known that when two dissimilar metals, or other electrically conductive materials, are placed in contact thereby forming a thermocouple, and an electric current is passed through them in a certain direction, a reduction in temperature takes place at the junction between the two materials. It is a general object of the present invention to produce such a cooling effect by means of a device made according to this invention in which one wall of the thermocouple is the boundary of an enclosed region within which the cooling is to be effected.

It is another object of the invention to provide a novel method of making such a cooling device by depositing one element of a thermocouple in the form of a film or coating onto the other element of the couple.

Another object is to provide a method of making a cooling device in which pairs of such deposited films are used to advantage in a unique fashion to provide enhanced cooling of the wall on which they are deposited.

A further object is to provide a method of making a device whose structural nature is such that its usefulness as a cooling instrument is of unusually wide scope. Merely by way of example the device formed by means of the invention will be illustrated and described in connection with the cooling of a liquid, such as blood, flowing through a tube, but it is to be understood that the invention is by no means restricted in its usefulness or applicability.

The device formed by means of the invention has been successfully employed to cool blood flowing to a particular part of the body, such as an organ or limb, during a surgical operation in order to cool that part of the body and thus lessen the effects of the surgery and prolong the safe working time of the surgeon. In the case of such a surgical tool, a metal tube through which the blood flows serves as the self-sustaining member of a thermocouple, and the tube carries on its outer surface an electrically conductive film. The tube and film form a thermocouple which, when connected in series to a source of electric current, becomes cooled. Hence, if the tube is interposed between the severed ends of a blood vessel, the temperature of the blood flowing through, and contacting the inner surface of, the tube is reduced.

The film or coating on the tube or wall is graphite, because of its stability, ability to withstand repeated heating (for sterilization, e.g.), and immunity to immersion effects. However, as discussed in applicant's co-pending application Ser. No. 195,681, filed May 18, 1962, in order that the graphite have a maximum "figure of merit" the crystals of the graphite film must have a particular orientation with respect to the flow of electric current through the graphite. It is therefore a further object of the invention to provide a method for producing a cooling device employing a graphite film the crystals of which are arranged with their *c* axes in the direction of electric current flow through the film when the device is in operation.

Other objects and advantages will be apparent from the following detailed description of one embodiment of the invention, and one method of making that embodiment.

The specific example chosen to illustrate the method of the present invention is a device for cooling blood as it flows through a blood vessel. However, it is to be understood that the invention is not limited to this particular use. For example, the wall of the metal tube illustrated might be thought of as a wall defining any enclosed region to be refrigerated.

The tube 10 may be made of any "stainless" metal, such as nickel, molybdenum, or stainless steel, and for blood cooling purposes its preferred dimensions are ⅛–⅜ inch in diameter, .015–.020 inch wall thickness, and ½–3 inches in length. The tube 10 is coated with a film 11 of graphite, which is electrically dissimilar from the metal of the tube. Consequently, a thermocouple is produced, the tube wall being one element of the thermocouple and the film of graphite being the second element.

As is well known, the performance characteristics of thermoelectric devices can be conveniently rated by a value known as the "figure of merit." This parameter is proportional to the square of the thermoelectric E.M.F., and inversely proportional to resistivity and thermal conductivity of the couple, all measured in the direction of current flow through the junction of the thermocouple, and the "figure of merit" is advantageously as high as possible. Whereas graphite has the desirable rugged qualities mentioned above, it does not exhibit a high enough "figure of merit" for practical purposes unless deposited on the tube and treated in a manner such as the one now to be described.

Figures 1, 2, 3, 4:
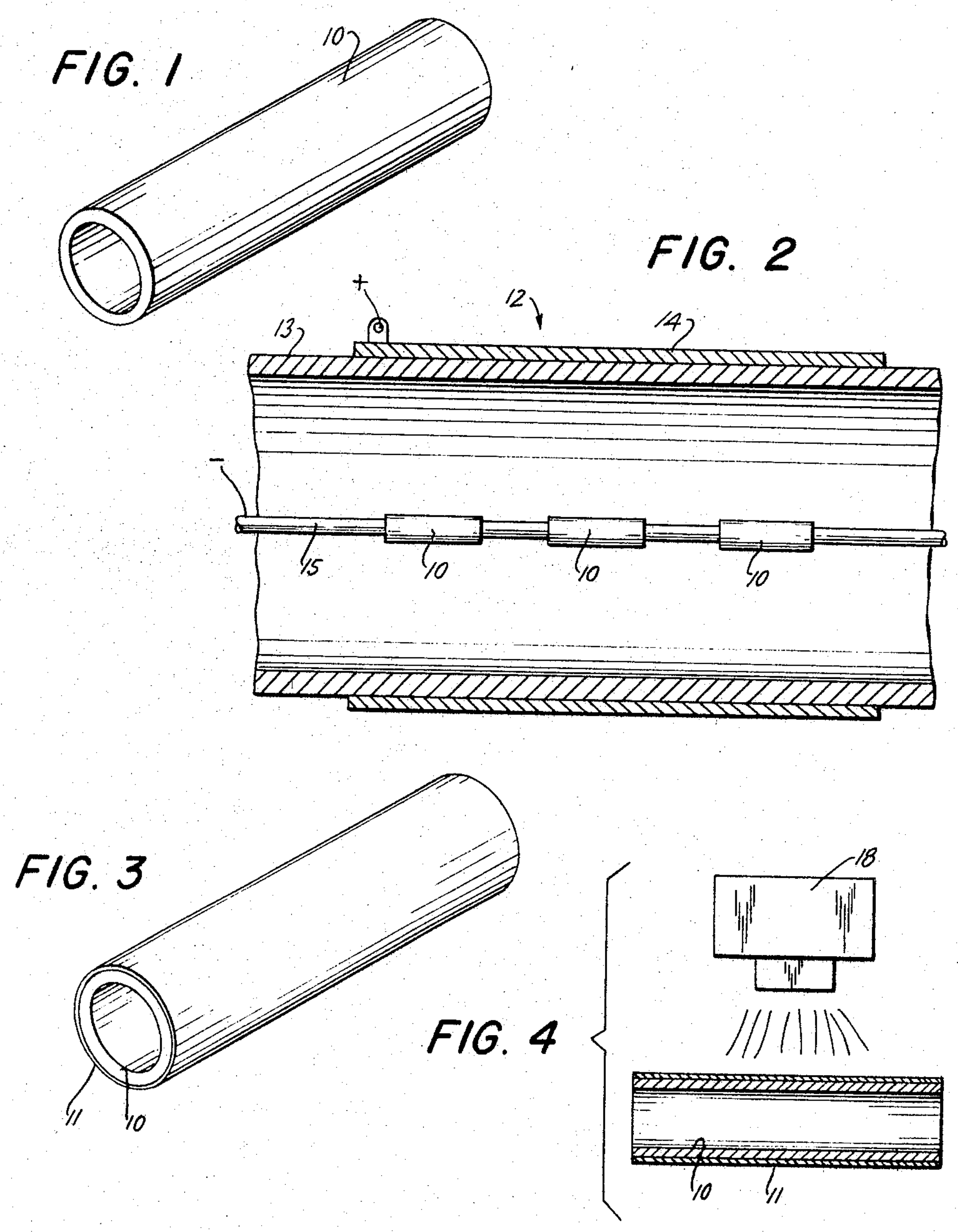
FIG. 1 is a perspective view of a metal tube.
FIG. 2 is a cross-sectional view of a furnace for depositing an oriented graphite film on tubes such as the one shown in FIG. 1.
FIG. 3 is a view similar to FIG. 1 showing the tube carrying a graphite film on its outer surface.
FIG. 4 shows the step of irradiating the graphite film by penetrating radiation.

The metal tube 10 may be provided with a graphite coating 11 in a deposition furnace 12 (FIG. 2). Deposition furnaces are well known and may include a cylindrical shell 13 into which is introduced a hydrocarbon gas, such as methane, and which is heated, as by electric means, to a temperature (of the order of 2100° F.) capable of burning and cracking the hydrocarbon gas. According to the present invention the shell 13 of the furnace is girdled by an outer tubular electrode 14. A metal rod 15 serving as an inner electrode extends longitudinally through the furnace. The rod is appropriately formed to carry the metal tube or tubes 10 to be coated. Throughout the cracking operation which causes crystalline graphite to be deposited on the relatively cool surfaces of the tubes 10, a high direct current potential difference is applied between the electrodes 14 and 15 producing an intense electrostatic field within the furnace. An electrostatic field of several thousand volts per inch is usually employed. The direction of this field will obviously be perpendicular to every point on the outer surface of each tube 10, and the effect of the field will be to cause the graphite crystals to be deposited with their *c* axes in the direction of the field, i.e., the *c* axes of the deposited crystale will be perpendicular to the surface of the tube upon which they are deposited.

A graphite crystal exhibits along its *c* axis its highest thermoelectric E.M.F. and its lowest thermoconductivity (both favorable factors as far as "figure of merit" is concerned). However, the resistivity along this axis is highest, a factor which normally tends to reduce the "figure of merit." Nevertheless, when the graphite is employed in the form of a thin film or coating, and the direction of current flow is transversely through the film, the resistivity is negligible even though the current flow is along the *c* axis.

In the drawings, the thickness of the film has been greatly exaggerated for clarity. In practice, the film is ordinarily less than twenty mircons in thickness.

The coated tubes are then preferably subjected to penetrating radiation, as indicated in FIG. 4, emitted by any standard source 18. The term "penetrating radiation" is intended to be used in its radioactive sense, i.e., it alludes to radiation capable of penetrating through one mm. of lead. For example, gamma rays, hard X-rays, neutrons, or other atomic particles can be used. Electron bombardment might be obtained from a multi-million-volt electrostatic accelerator; or gamma rays might be obtained from atomic piles or radioactive isotopes. The exact source and nature of the radiation is not critical, so long as it is sufficiently intense to cause a large number of defects in the crystal lattice of the graphite. It is known that the exposure of crystals, notably those of graphite, to penetrating radiation increases the existing number of lattice defects and thus increases the thermoelectirc voltage obtainable from a material thus treated.

The tube 10 and film 11 are, of course, a thermocouple, and if the film is connected to one terminal of an electrical source and the tube to the other terminal, the tube and film experience a reduction in temperature. A feature of the invention is to employ such a thermocouple as one of a pair. This greatly simplifies the manufacturing procedure, and enhances the cooling effect in an unusually simple and effective manner. It also facilitates the employment of the device as an insert in an existing conduit such as a blood vessel, since both terminals of the applied current source can be formed on the coating, leaving the tube itself free for coupling at both ends with the blood vessel or other tube with which it is to be associated.

In order to permit both terminals of the electrical source to be connected to the graphite film, one portion of the film must be electrically positive with respect to the metal of the tube, and another portion electrically negative. The graphite film is naturally electrically positive, and hence a portion of the film must be treated to make it electrically negative with respect to the tube.

Figure 5:
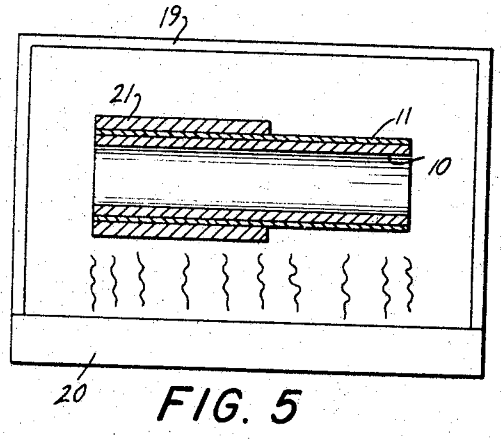
FIGS. 5 and 6 show the steps of infusing atoms of different materials into the graphite crystal lattices.

One way of accomplishing this is to infuse into the lattices of the graphite crystals atoms of a material capable of rendering the graphite film relatively electrically negative. One such material is molybdenum disilicide ($MoSi_2$). The $MoSi_2$ may be infused into the graphite crystal lattices by means of a vacuum chamber 19 (FIG. 5) open to a source 20 of $MoSi_2$ vapor. Before the coated tube is placed into the vacuum chamber, it is masked for slightly more than one-half its length by a metallic mask 21. Consequently, the $MoSi_2$ atoms become diffused into the lattices of the graphite crystals on the unmasked portion of the tube only. The tube may be rotated over the source of vapor 20 to insure that the entire unmasked portion of the film is exposed to the vapor. After a few minutes of exposure, enough atoms are infused into the graphite film to make it electrically negative with respect to the tube.

Figure 6:
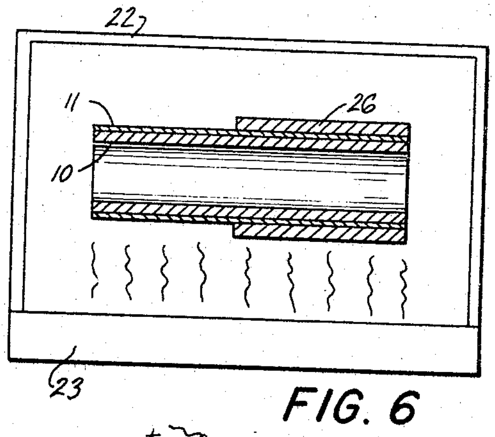

Thereafter, if desired, atoms of a metal, preferably an alkali metal such as potassium, may be infused into the crystal lattices of the previously masked portion of the graphite film. The purpose of this step is to reduce the already low electrical resistance of the graphite film. Infusion of the metal atoms may be brought about as shown in FIG. 6, in a vacuum chamber 22, identical to the vacuum chamber 19, except that it is open to a source 23 of metal vapor. While alkali metals are preferred, others may also be used, particularly boron, silicon, and molybdenum.

Before the tube is placed into the vacuum chamber 22, the previously unmasked portions of the tube and film are masked by means of a metallic mask 26. The mask 26, like the mask 21, is slightly longer than one-half the length of the tube 10. Consequently, as indicated in FIG. 7, a portion A of the film 11 slightly less than one-half the length of the tube 10 will be infused with atoms of $MoSi_2$ or equivalent material, a portion B also slightly less than one-half the length of the tube will be infused with atoms of potassium or equivalent material, and a central buffer portion C will be free of infused atoms.

Figure 7:
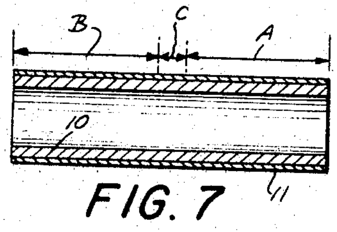
FIG. 7 is a cross-sectional view of the graphite-coated tube after the steps shown in FIGS. 5 and 6.
Figure 9:
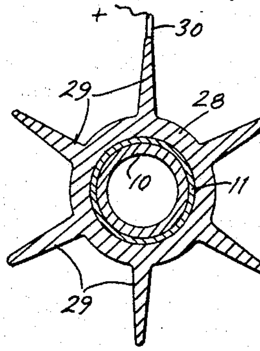
FIG. 9 is a cross-sectional view taken along the line 9—9 of FIG. 8.

In order to make a blood cooling device from the coated tube of FIG. 7, the graphite adjacent to the ends 27 (see FIG. 8) of the tubes is scratched off, and the remaining regions of the film portions A and B are coated with a good contact metal such as copper, zinc, nickel, or gold. This coating may be effected by vacuum deposition in which case the portion C of the film and the regions adjacent to the ends of the tube are masked before placing the tube in the vacuum chamber. Thereafter, a contact band 28 is placed over each of the metal coated regions of the graphite film (see FIGS. 8 and 9 in which the metal coatings have not been shown for the sake of clarity). These contact bands are fluted or ribbed to provide fins 29 to aid in the dissipation of heat, and each band is provided with a terminal 30 for connection to a source of electric current. The contact bands may be formed of sheet metal or preferably are die cast or zinc or aluminum.

Figure 8:
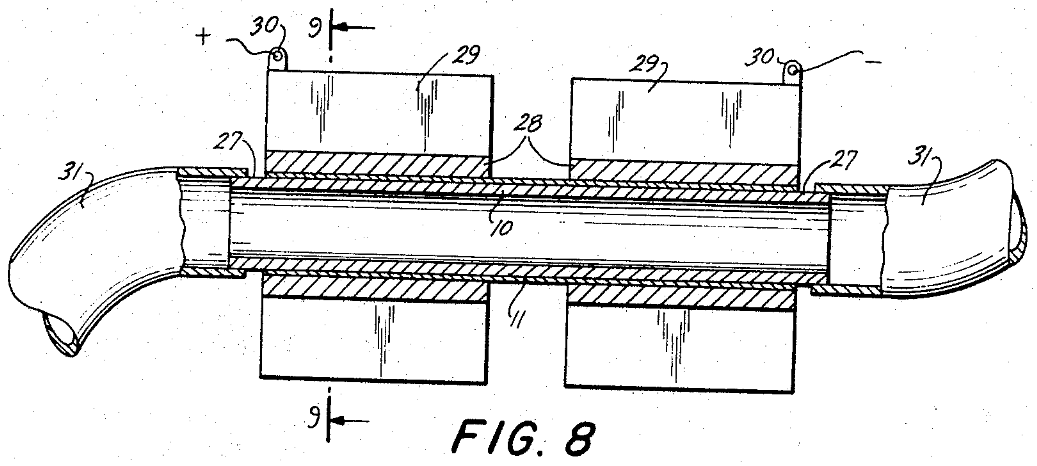
FIG. 8 is a cross-sectional view of a blood cooling device fabricated in accordance with the present invention disposed between the severed ends of a blood vessel.

When a device according to the present invention is to be used to cool a particular part of the human body during surgery, the blood vessel 31 supplying blood to that part of the body is severed, and the cooling device is interposed between the severed ends of the blood vessel as shown in FIG. 8. The severed ends of the blood vessel are secured to the opposite ends 27 of the cooling device so that the blood flowing through the blood vessel is conducted through the tube 10 and contacts the inner wall of the tube. The terminals 30 are connected to a source of direct current preferably through a current limiting device such as a rheostat. The current flows radially inwardly through one contact band 28 and the portion of the graphite film directly beneath it and into the metal tube 10. As it passes the junction between the film and tube it produces a decrease in temperature in the tube. The current continues longitudinally along the tube and then flows radially outwardly through the other contact band 28 and the portion of the graphite film directly beneath it. As the current passes the junction between this latter portion of the film and the tube it produces a further cooling of the tube. Hence the blood flowing through the tube 10 and contacting it will be cooled, and the part of the body to which the blood flows immediately thereafter will also be cooled. Furthermore, by regulating the current flowing into the device, as by means of the rheostat, it is possible to adjust the amount of cooling produced and accurately regulate the temperature of the fluid flowing, even to fractions of a degree.

A specific example of a cooling device constructed in accordance with this invention will now be given. A nickel tube two inches in length ¼ inch in diameter, having a wall thickness of .020 inch, and coated with a graphite film, as described above, was provided with two contact bands each having six fins disposed at 60° angles, each pair of diametrically opposite fins measuring ½ inch from tip to tip. Upon passage of a direct current of five volts and ten amperes through the device it experienced a temperature drop of 65° C.

It will be seen that a cooling device made according to method of this invention is rugged, readily cleanable in water and solvents, and is not damaged by repeated heating in the usual sterilization procedures. Furthermore, it exhibits a relatively large "figure of merit" due to the following factors: the current path from contact band through the film, either graphite or semi-conductor, is very short, being only the film thickness, and is large in cross-sectional area resulting in very low series resistance of the couple; the oriented and radiated graphite generates a relatively large thermal E.M.F., and the orientation of the graphite substantially reduces thermal conductivity.

The invention has been shown and described in terms of a method of making a tubular cooling device for fluids, particularly blood. However, it is obvious that the invention has much broader significance with respect to thermocouples in general and cooling devices in particular. It is understood, therefore, that the invention is not limited to any specific form or embodiment except insofar as such limitations appear in the appended claims.

What is claimed is:

1. A method of making a thermoelectric cooling device comprising the steps of providing a metal element, depositing a graphite film on the surface of said element in such a way that the *c* axes of the graphite crystals are perpendicular to the surface of said element, masking the film covering a first portion of said element, placing said element in an atmosphere of atoms of a material which is electrically negative with respect to the metal of said element whereby the unmasked portion of the film becomes infused with said atoms, removing said mask, and providing said first portion and the remaining portion of said film with terminals for connection to a source of electricity.

2. A method according to claim 1 including the step of exposing said metal element to a source of penetrating radiation after deposition of the graphite but before said masking step in order to produce defects in the lattices of the graphite crystals of the film.

3. A method according to claim 1 including the step of masking the film covering all but said first portion of said metal element, and placing said element in an atmosphere of metal atoms whereby said first portion of said film becomes infused with said metal atoms in order to reduce its resistivity.

References Cited

UNITED STATES PATENTS 3,071,495 1/1963 Hanlein ------------ 117—212

ALFRED L. LEAVITT, *Primary Examiner.*

A. ROSENSTEIN, *Examiner.*